US012017240B2

(12) United States Patent
Mercier

(10) Patent No.: US 12,017,240 B2
(45) Date of Patent: Jun. 25, 2024

(54) EFFICIENT SPRAY APPLICATOR FOR UNIVERSAL USAGE

(71) Applicant: Michel Mercier, Herzlia (IL)

(72) Inventor: Michel Mercier, Herzlia (IL)

( * ) Notice: Subject to any disclaimer, the term of this patent is extended or adjusted under 35 U.S.C. 154(b) by 0 days.

(21) Appl. No.: 16/647,954

(22) PCT Filed: Sep. 17, 2018

(86) PCT No.: PCT/IL2018/051048

§ 371 (c)(1),
(2) Date: Mar. 17, 2020

(87) PCT Pub. No.: WO2019/064295

PCT Pub. Date: Apr. 4, 2019

(65) Prior Publication Data

US 2020/0246824 A1 Aug. 6, 2020

(30) Foreign Application Priority Data

Sep. 26, 2017 (IL) ........................................ 254703

(51) Int. Cl.
*B05B 12/36* (2018.01)

(52) U.S. Cl.
CPC .................................. *B05B 12/36* (2018.02)

(58) Field of Classification Search
None
See application file for complete search history.

(56) References Cited

U.S. PATENT DOCUMENTS 3,302,235 A 2/1967 Gerber
5,070,819 A 12/1991 Helmstetter
2016/0107185 A1* 4/2016 Smith .................... B05B 12/40 239/104
2016/0194140 A1* 7/2016 Sell ........................ B65D 83/22 222/153.11
2016/0221744 A1* 8/2016 Coppus ................ B65D 83/206
2020/0095054 A1* 3/2020 Pindor ................. B65D 83/303

FOREIGN PATENT DOCUMENTS

DE 8109756 U1 * 9/1982 ............ B65D 83/14
WO 8502829 A1 7/1985
WO WO 85/02829 * 7/1985 ............ B65D 83/30

OTHER PUBLICATIONS

PCT Search Report for International Patent Application No. PCT/IL2018/051048, dated Jan. 20, 2019, 3 pp.
PCT Written Opinion for International Patent Application No. PCT/IL2018/051048, dated Jan. 20, 2019, 5 pp.
PCT Preliminary Report on Patentability for Patent Application No. PCT/IL2018/051048, dated Mar. 31, 2020, 6 pp.

* cited by examiner

*Primary Examiner* — Jethro M. Pence
(74) *Attorney, Agent, or Firm* — The Roy Gross Law Firm, LLC; Roy Gross

(57) ABSTRACT

An applicator (10) for spray application having a flat panel body (12) having a proximal end (14) and a distal end (16). The said proximal end (14) of the said flat panel body (12) is structured as a connector in a circular shape forming a rim (22) having an inner surface (24) and an outer surface (26), wherein, the said inner surface (24) of the said rim (22) functions as a connector to be fitted perfectly with the lid of a universal sprayer (28). Said applicator enables the application of spray in a straight line rather than a circular or oval shape.

16 Claims, 12 Drawing Sheets

EFFICIENT SPRAY APPLICATOR FOR UNIVERSAL USAGE

CROSS REFERENCE TO RELATED APPLICATIONS

This application is a National Phase of PCT Patent Application No. PCT/IL2018/051048 having International filing date of Sep. 17, 2018, which claims the benefit of priority of Israel Application No. 254703 filed Sep. 26, 2017. The contents of the above applications are all incorporated by reference as if fully set forth herein in their entirety.

FIELD OF THE INVENTION

The present invention relates to a spray applicator, and more particularly, to a spray applicator for efficient spraying of paint and/or coloring agents on non-round surfaces. The spray applicator has specific embodiments attached either on the outer frame of the round top of the container or inside the top for specific spraying.

BACKGROUND OF THE INVENTION

Spray applicators are utilized for a variety of uses and purposes in real world. Most of these applicators embody adjustable spray applicators for varying or changing the direction from or location to which fluid from an attached nozzle needs to be sprayed.

These spray applicators sprays various types of fluid, including paints, or different coloring agents in bursts of various geometric patterns.

In spraying systems, nozzles determine the application volume at a given operating pressure, travel speeds, and spacing that break the liquid into droplets and form the spray pattern. It determines the amount of spray volume at a given operating pressure, travel speed, and spacing. Drift can be minimized by selecting nozzles that produce the largest droplet size while providing adequate coverage at the intended application rate and pressure. Selecting nozzles that produce the largest droplet size, while providing adequate coverage at the intended application rate and pressure, can minimize drift. The size of the spray particle is important because it affects both efficacy and spray drift of the application. All the spray applicators use conventional nozzles that entail inefficiency in their spray formation thus necessitating their modifications, which is attempted in the present invention.

The present sprayer nozzles available in the market, are conical in shape and hence, cone nozzles yields complete spray coverage in a round or oval shape. This type of colouring is perfect, if the surface on which it is to be sprayed is round. But if the liquid or the color to be sprayed is on a non round surface, then the present applicators have specific disadvantages. In case of a non round surface, the application of colour becomes difficult since the sprayed colour may spill into the area which is either not required to be coloured or a different colouration is required. This can be applicable in case of colouring hair (non round surface) or any such surface which is not round in the edges. Particularly, in case of colouring hair, while spraying, the colours, usually gets spilled over to the scalp as well, which can be avoided by using the applicator of the present invention.

To establish the uniqueness of the present innovation, a discrete survey of similar patents revealed the following:

U.S. Pat. No. 8,316,863 B2 titled "Applicator nozzle and applicator assembly incorporating such a nozzle" discloses an applicator using teeth in a comb shape is expensive to produce and lack efficiency since it sprays to close to the hair. The applicator nozzle comprises an attachment portion configured to attach the nozzle to a receptacle configured to contain a product and an arrangement of at least two teeth disposed so as to form at least one row comprising first and second end teeth.

US20110005538 A1 titled "Agents, compositions and devices for temporary coloring local hair areas" discloses hair-coloring applicators comprising a shield to protect the scalp, polymers of tannic acid having iron ions bound thereto, hair-coloring compositions comprising same and/or melanoidin, and novel alcohol-free carriers, are disclosed, as well uses thereof for coloring hair.

U.S. Pat. No. 3,302,235A titled "Applicator attachment for aerosol shaving cream container" discloses an applicator attachment for aerosol shaving cream. the applicator is used there to help spread the cream and is of a round shape thus it couldn't be used for material that is not a foam or cream and couldn't be used for bordering the application of a sprayed material/

WO 2016187548 A1 titled, "Inline avian spray applicator with rapidly-actuating automatic spray nozzles" relates to spray applicator devices and methods of use for vaccinating, or administering probiotics to avian animals. Said automated spray applicator device comprises a housing, at least one rapidly actuatable automatic spray nozzle, a programmable spray module, for controlling the automatic spray nozzle(s), and optionally a source of pressurized air for supplying pressure to the fluid prior to its entry into the spray nozzles; wherein the programmable spray module is in electrical, pneumatic or hydraulic connection with the at least one automatic spray nozzle; wherein the automatic spray nozzle (s) is(are) in fluid communication with a fluid reservoir/tank; and wherein the automatic spray nozzle comprises an electrical, pneumatic or hydraulic actuator and a nozzle tip.

US 20130245576 A1 titled, "Applicator spray nozzles with pressure relief" talks of a spray nozzle for applying a medicinal agent to a tissue. The spray nozzle comprising a tip housing and a valve. The tip housing has a distal end, a proximal end, and a lumen that extends between the ends and defines a lengthwise central axis. The valve has an elongated body that extends through the lumen of the tip housing, along the lengthwise central axis. The valve, being configured to slide within the lumen of the tip housing, in an extended position with respect therewith is configured to disperse the medicinal agent toward the tissue. When the valve is in the retracted position with respect to the tip housing, the medicinal agent is vented away from the tissue.

US 20060065765 A1 titled "Fluidic nozzle for trigger spray applications" talks of a fluidic nozzle, for use with a trigger spray applicator that issues a desired spray pattern of fluid droplets, and wherein the applicator has a liquid delivering orifice and an exterior surface proximate the orifice that is configured to receive a spray nozzle, includes in a first preferred embodiment a member having a front and a rear surface and a passage that extends between these surfaces. A portion of this passage is configured in the form of a fluidic circuit, and the configuration of this fluidic circuit is chosen so as to provide the desired spray pattern. Additionally, the passage's rear portion may be configured so as to allow this member to fit on that portion of the spray head which is configured to receive a spray nozzle.

U.S. Pat. No. 8,303,531 B2 titled, "Spray applicator with positionable spray tip" discusses an apparatus for applying a spray to a selected site on a patient includes a sheath having a through bore extending from a first end to a second end. A flexible multi-lumen tube is secured within the sheath and has a distal portion that extends beyond the second end of the sheath. A malleable wire is positioned within at least the distal portion of the multi-lumen tube wherein manual force is exerted upon the distal portion to position the distal end in a selected position by bending the malleable wire. A housing is attached to the rigid outer sheath and has a plurality of ports for engaging a multi-tube syringe and a port for injecting a gas into the selected site wherein each port is in communication with at least one lumen. A spray nozzle is removably attached to the distal end of the multi-lumen tube wherein the at least one liquid and the gas are discharged from the multi-lumen tube and into the spray nozzle such that the aerosol exiting the spray nozzle is effective in treating the selected site.

U.S. Pat. No. 5,129,356 A titled "Fluid applicator" talks of an applicator for applying multiple lines of a fluid to a substrate includes a manifold having a plurality of fluid flow passages with a like plurality of spaced apart fluid outlets and at least one fluid inlet. Fluid spray nozzles are attached to the manifold in fluid flow communication with the fluid outlets of the manifold. The manifold further includes a swivel mounting for allowing the manifold to pivot about an axis parallel to the spray axes of the spray nozzles.

SUMMARY OF THE INVENTION

It is an object of the present invention to provide a novel spray applicator that is universal in its ability to fit with all sorts of spray containers such as aerosol and likewise, on a commercial basis.

It is another object of the invention to develop a novel spray applicator that has provision for attachment in the outer frame of the round top of the container or inside the top to enable a specific burst of spray patterns that is compatible for non-round surface painting.

Another object of the present invention is to develop a novel spray applicator that is designed to be at an angle in accordance with the angle of the out-coming spray to enable spray pattern in a semi-circular/semi elliptical shape for painting of straight edge.

Still another object of the invention is to incorporate an applicator, having its application edge, shaped in a variety of ways to enable spraying and giving a differently shaped edge to the applied burst of colour in accordance with the requirement of the surface of the sprayed object.

Another object of the invention is the incorporation of an embodiment that allows the flat nozzle to be elevated at different spray angles to enable spray painting of different tops in the most optimum manner. Different angles of elevation of the applicator allow different spray-burst admissible to a typical surface.

Another object of the invention is the incorporation of flat-fan nozzles at several spray angles of 65, 73, 80, and 110 degrees to enable even spray pattern aligned properly on the sprayed surface.

Still another object of the invention is to allow the nozzle to be rotated about ten degrees from the axis of the boom to prevent droplets of adjacent nozzles from touching but still allowing for proper overlap of the spray pattern. The correct nozzle height is measured from the nozzle to the target, which may be the top of the ground, growing canopy, or stubble.

Skilled practitioners will derive a more complete understanding of the invention from a consideration of the following detailed description of the preferred embodiments, particularly if it is read in conjunction with the appended drawings, a brief description of which now follows.

REFERENCE NUMERALS

Figure 1:
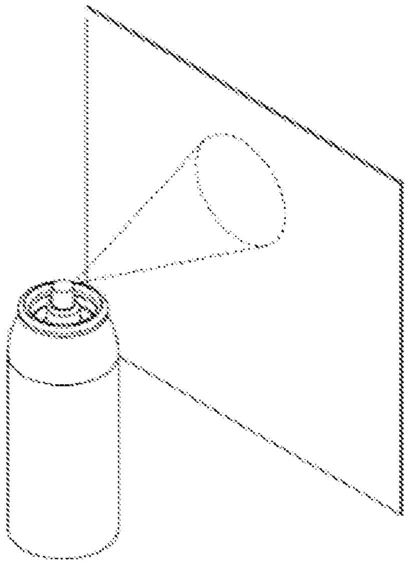
FIG. 1 illustrates the isometric view of the sprayed material on to the object in prior art using the simple sprayer.
Figure 2:
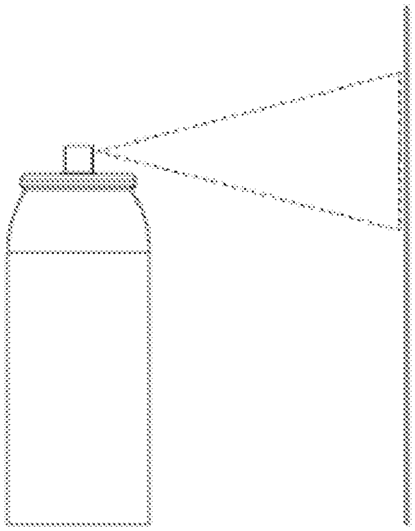
FIG. 2 illustrates the side view of the sprayed material on to the object in prior art using the simple sprayer.
Figure 3:
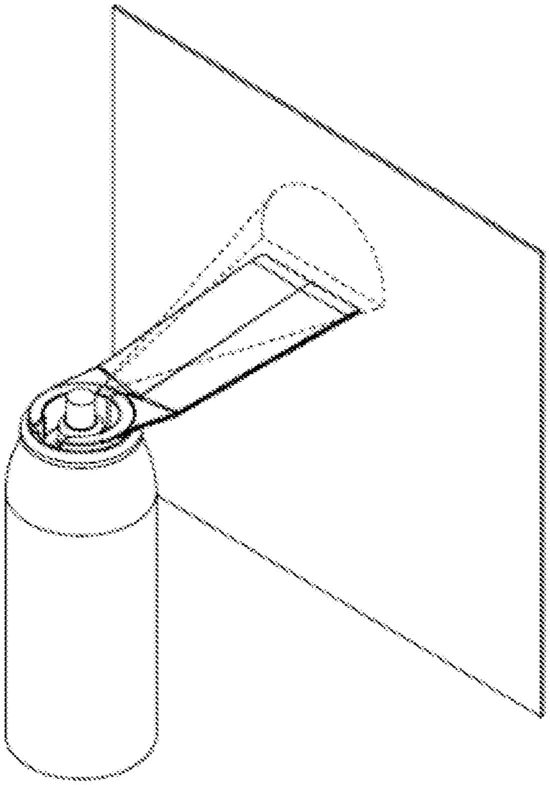
FIG. 3 illustrates the isometric view of the sprayed material on to the object using the applicator of the present invention, fitted to the sprayer.
Figure 4:
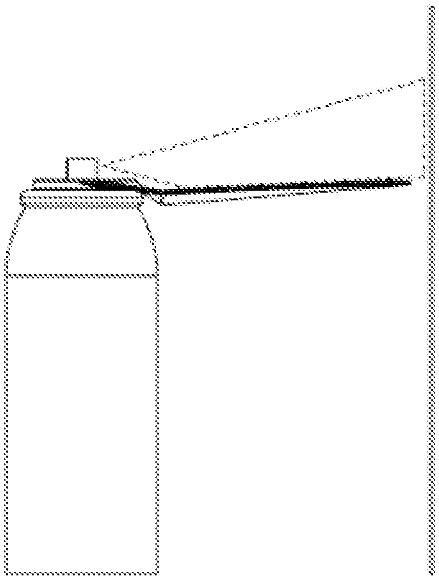
FIG. 4 illustrates the side view of the sprayed material on to the object using the applicator of the present invention, fitted to the sprayer.
Figure 5:
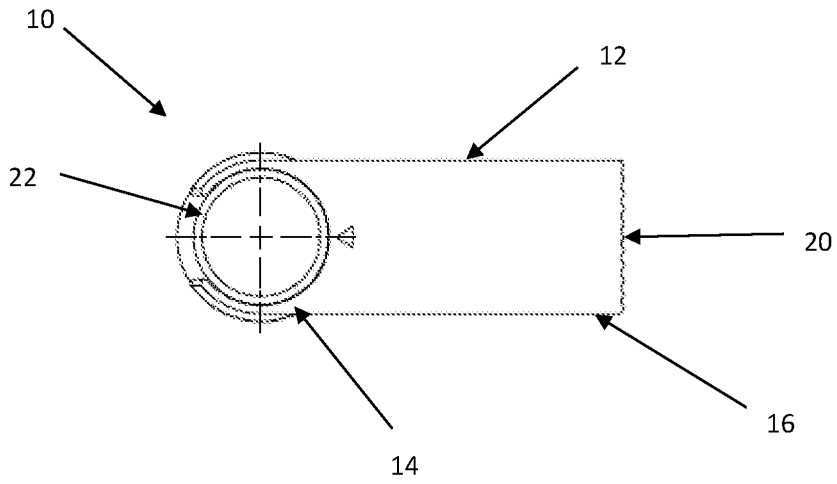
FIG. 5 illustrates the top view of the applicator mounted on the outer surface of the sprayer of the present invention.
Figure 6:
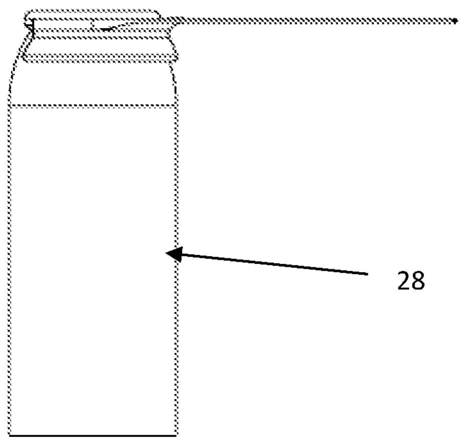
FIG. 6 illustrates the side view of the applicator mounted on the outer surface of the sprayer of the present invention.
Figure 7:
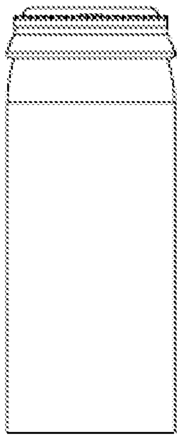
FIG. 7 illustrates the front view of the applicator mounted on the outer surface of the sprayer of the present invention.

10 applicator
12 Flat panel body
14 proximal end
16 distal end
18, 18' side edges
20 distal edge
22 rim
24 inner surface
26 outer surface
28 sprayer
30 skirt
32 major arc
34 minor arc
36 gap
38 tooth
40 concave arc
42 convex arc

DETAILED DESCRIPTION OF THE PREFERRED EMBODIMENTS

Figure 8:
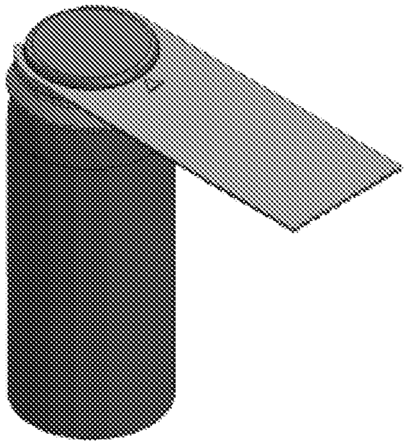
FIG. 8 illustrates the isometric view of the applicator mounted on the outer surface of the sprayer of the present invention.
Figure 14:
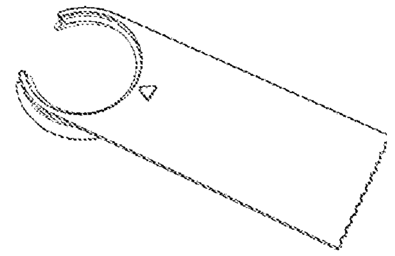
FIG. 14 is an isometric view from top of the applicator for mounting on the outer surface of the sprayer of the present invention.
Figure 15:
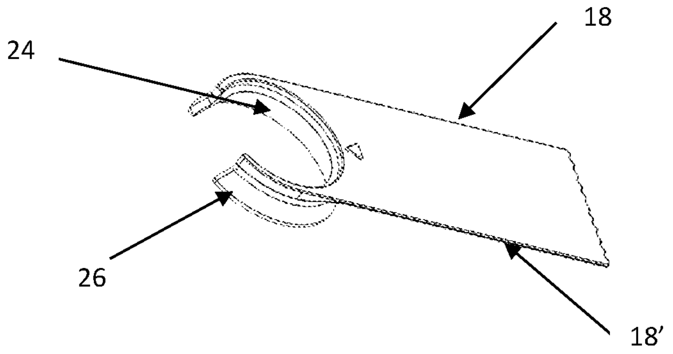
FIG. 15 is an isometric view from side of the applicator for mounting on the outer surface of the sprayer of the present invention
Figure 16:
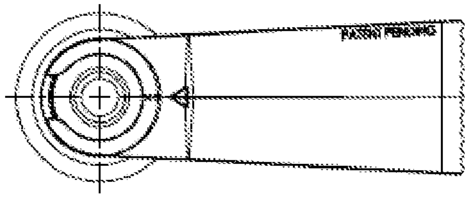
FIG. 16 illustrates the top view of the applicator mounted on the inner surface of the sprayer of the present invention.
Figure 17:
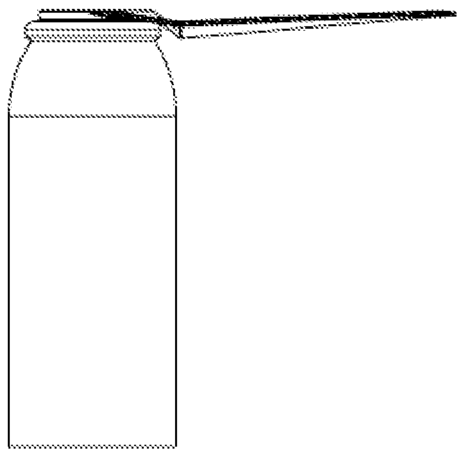
FIG. 17 illustrates the side view of the applicator mounted on the inner surface of the sprayer of the present invention.
Figure 18:
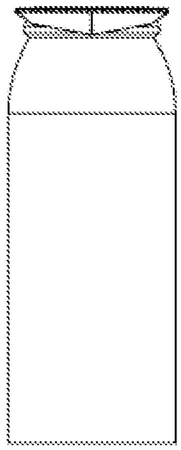
FIG. 18 illustrates the front view of the applicator mounted on the inner surface of the sprayer of the present invention.
Figure 19:
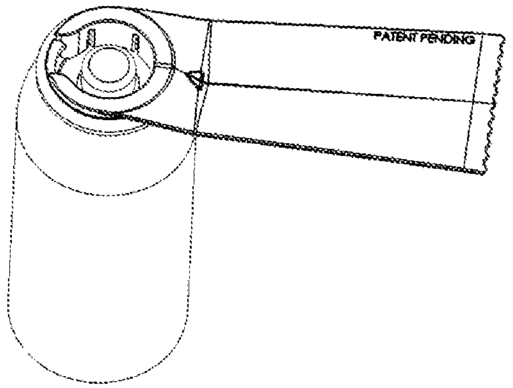
FIG. 19 illustrates the isometric view of the applicator mounted on the inner surface of the sprayer of the present invention.
Figure 20:
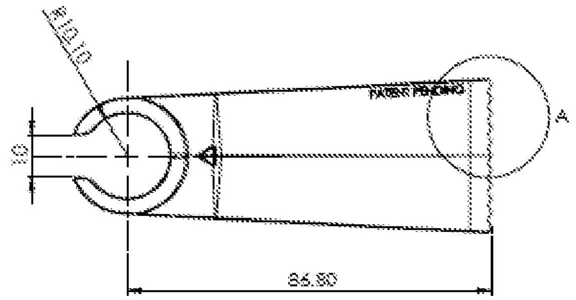
FIG. 20 is a technical illustration of the top view of the applicator for mounting on the inner surface of the sprayer of the present invention.
Figure 21:
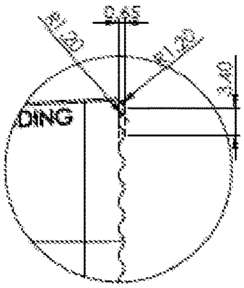
FIG. 21 is a technical illustration of an enlarged view of detail A of the applicator for mounting on the inner surface of the sprayer of the present invention.

Referring to the drawings, wherein like reference numbers indicate like elements throughout the several figures, FIGS. 8 and 14 illustrates the isometric view of an applicator (10) for spray application having a flat panel body (12) having a proximal end (14) and a distal end (16). The said proximal end (14) of the said flat panel body (12) is structured as a connector in a circular shape forming a rim (22) having an inner surface (24) and an outer surface (26), wherein, the said inner surface (24) of the said rim (22) functions as a connector to be fitted perfectly with the lid of a universal sprayer (28). The said rim (22) of the connector is extended downwards to form a skirt (30) having a width of 10.30 mm like the lid of a container without the top surface. The circular rimmed structure of the connector helps in mounting it with the outer surface of the lid of the sprayer as is depicted in FIG. 8.

The said circular rim along with the skirting can further be divided into a major arc portion (32), from where the said flat panel shaped applicator structure extends for spray application, whereas the minor arc portion (34) positioned diametrically opposite to the said applicator is left open, for easy adaptability with any sprayer bottle.

The edge (20) of the distal end of the flat panel body is straight. The other two side edges (18), (18') of the panel are also straight and are devoid of any corrugations and design.

The thickness of the flat panel body (12) is maintained at 0.76 mm. It will be known to those skilled in the art, that the width of the said flat panel, and the angle at which the spraying needs to be done are correlated. In the present embodiment the width is maintained at 36.70 mm.

Figure 9:
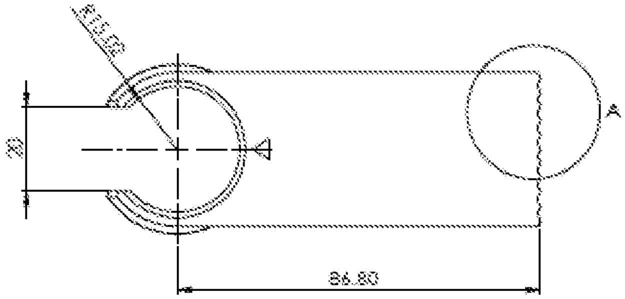
FIG. 9 is a technical illustration of the top view of the applicator for mounting on the outer surface of the sprayer of the present invention.
Figure 10:
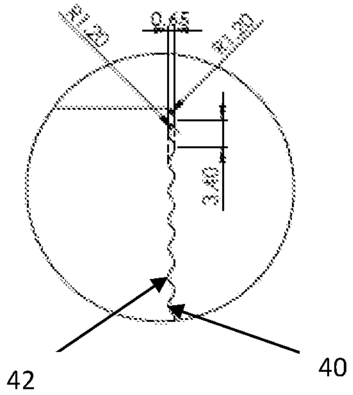
FIG. 10 is a technical illustration of an enlarged view of detail A of the applicator for mounting on the outer surface of the sprayer of the present invention.
Figure 11:
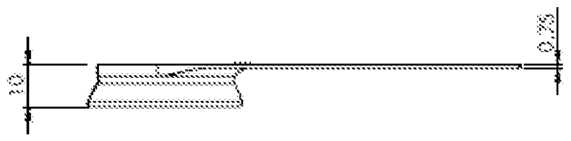
FIG. 11 is a technical illustration of the applicator in its side view for mounting on the outer surface of the sprayer of the present invention.
Figure 12:
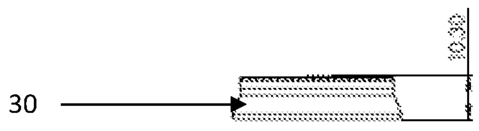
FIG. 12 is a technical illustration of the applicator in its front view for mounting on the outer surface of the sprayer of the present invention.
Figure 13:
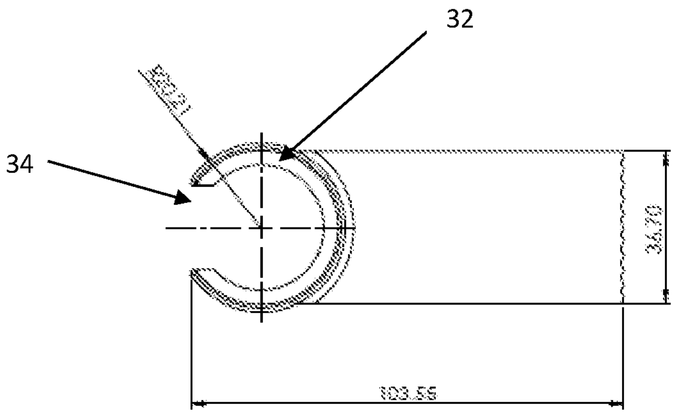
FIG. 13 is a technical illustration of the applicator from its bottom for mounting on the outer surface of the sprayer of the present invention.

In an embodiment of the present invention, and referring to FIGS. 9 and 13, the radius of the inner surface (24) of the circular rim (22) of the proximal end of the panel is maintained at 15.02 mm and the radius of the outer surface (26) of the said circular rim (22) of the connector of the proximal end of the panel is maintained at 20.21 mm.

As depicted in FIG. 9, of the present embodiment, the opening of the said minor arc (34) of the said circular rim (22), which lies diametrically opposite to the said applicator (10), is maintained at 20 mm. In this embodiment, the length of the said flat panel connector from the end of the nozzle at the distal end of the applicator till the centre of the circular rim (connector) of the applicator at the proximal end measures 86.80 mm. The total length of the applicator measuring from the tip of the distal end of the applicator is maintained at 103.55 mm as is illustrated in FIG. 13.

However, to those skilled in the art, it will be known that the length of the applicator will depend upon the object on which the liquid has to be sprayed, the type and purpose of spraying. Hence the length of the applicator can be varied accordingly.

In another embodiment of the present invention, as illustrated in FIGS. 16 to 26, for mounting the spray applicator within the inner surface of the lid of the sprayer, the extended skirting of the said rim is provided with gaps (36) at intervals, which gives it broad tooth like structure (38) to be adapted to be fitted with the inner surface of the lid of the sprayer.

In this embodiment of the present invention, the radius of the said inner surface (24) of the said circular rim of the said proximal end (14) of the panel is maintained at 10.10 mm and the radius of the outer surface (26) of the said circular rim of the connector of the proximal end of the panel is maintained at 13.95 mm.

Further, in the present embodiment, the opening of the minor arc (34) of the said circular rim (22), which lies diametrically opposite to the said applicator, is maintained at 10 mm. In this embodiment, the length of the flat panel from the end of the nozzle at the distal end of the applicator till the centre of the circular rim of the connector of the applicator at the proximal end measures 86.80 mm. The total length of the applicator measuring from the tip of the distal end of the applicator is maintained at 99.65 mm.

However, to those skilled in the art, it will be known that the length of the applicator will depend upon the object on which the liquid has to be sprayed, the type and purpose of spraying. Hence the length of the applicator can be varied accordingly.

Further, the sprayer of the prior art applicators usually sprays the liquid in the form of an elliptical shape on the surface to be sprayed, which is perfect, if the surface on which it is to be sprayed is round. But if the liquid or the color to be sprayed is on a non round surface, then the applicator of the prior art has specific disadvantages. To obviate the disadvantages of the prior art, an angled applicator with edges of the applicator variously designed is proposed, which sprays the liquid as desired on the surface with a straight edge or edges shaped differently also prevents spilling of the sprayed material.

Figure 22:
FIG. 22 is a technical illustration of the applicator in its side view for mounting on the inner surface of the sprayer of the present invention
Figure 23:
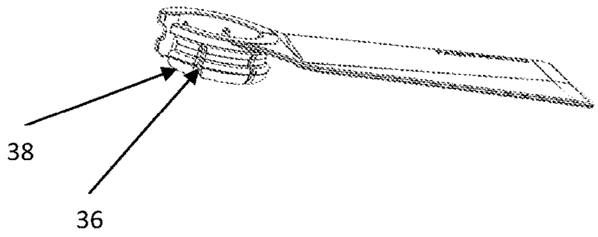
FIG. 23 is an isometric view of the applicator for mounting on the inner surface of the sprayer of the present invention.
Figure 24:
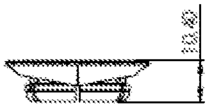
FIG. 24 is a technical illustration of the applicator in its front view for mounting on the inner surface of the sprayer of the present invention.
Figure 25:
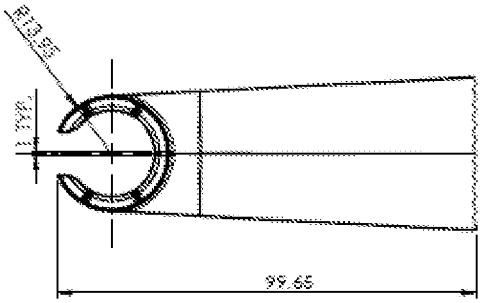
FIG. 25 is a technical illustration of the applicator from its bottom for mounting on the inner surface of the sprayer of the present invention.
Figure 26:
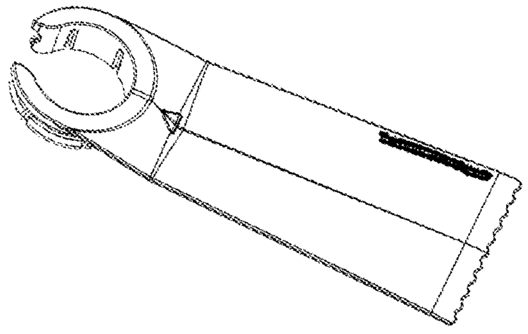
FIG. 26 is an isometric view of the applicator for mounting on the inner surface of the sprayer of the present invention.
Figure 27:
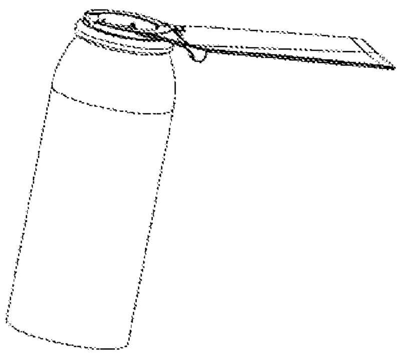
FIG. 27 illustrates the isometric view of the folded applicator mounted on the inner surface of the sprayer of the present invention.
Figure 28:
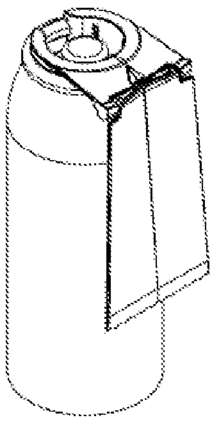
FIG. 28 illustrates the isometric view of the folded applicator mounted on the inner surface of the sprayer of the present invention with the applicator folded at 90 degree angle.
Figure 29:
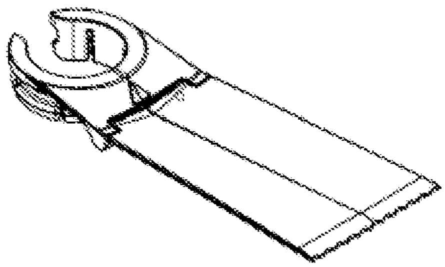
FIG. 29 illustrates the isometric view of the foldable applicator of the present invention.
Figure 30:
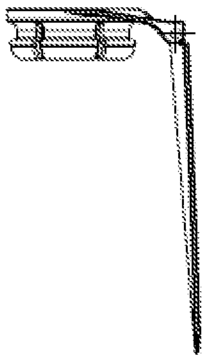
FIG. 30 is a side view of the foldable applicator.

Therefore, provided in this embodiment is an angled applicator. The flat panel applicator is designed to have an angle which is provided at a short distance from the proximal end of the applicator as shown in FIGS. 22-23 and FIG. 24. The designing of the applicator at an angle from the circular rim of the applicator, prevents blocking of the sprayed material.

Referring to FIG. 27 through FIG. 30, an embodiment of the present invention is shown, wherein the applicator can be folded at 90 degrees with respect to the nozzle of the sprayer or the connector of the applicator. The provision of an axle present at a short distance from the proximal end of the applicator helps the applicator to be folded.

The edge of the distal end of the applicator is variable depending upon the texture or type of surface to which the spray is to be applied.

Hence, in an embodiment of the present invention the edge of the distal end of the applicator is designed in a wavy form. This design is attained by an alternate concave (40) and convex (42) arrangement of the arcs, the radius of each arc being 1.20 mm. Each consecutive concave (40) or convex arc (42) is equidistant from each other. The distance from the centre of each concave or convex arc with respect to the next concave or convex arc is 3.40 mm. Further the width between the crest and trough of the curves is maintained at 0.65 mm for optimized spraying function In another embodiment of the present invention, the edge of the distal end of the panel of the applicator is designed to form triangles, thereby providing it with pointed like structure.

It is understood that the above description of the present invention is susceptible to considerable modification, change and adaptation by those skilled in the art, and that such modifications, changes and adaptations are intended to be considered within the scope of the present invention, which is set forth by the appended claims.

The invention claimed is:

1. An applicator for a spray application from a spray container or dispenser, the applicator comprising:
- a flat panel body having a proximal end and a distal end;
- two side edges joining the distal end and the proximal end;
- a distal edge of the distal end of the flat panel body having its edges variously designed;
- wherein, the proximal end of the said flat panel body is structured as a connector for adaptive fitting with a top of the spray container or dispenser;
- wherein, a distance between the side edges from the proximal end and continuing till the distal edge, is at least equivalent to a width of an angle of a spray and a length of said flat panel body is equivalent to a distance of an object to be sprayed;
- wherein the flat panel body has a downward indentation configured to contain excess spray and configured to prevent the excess spray from spilling sideways or towards the distal end of the flat panel body, and
- wherein the applicator allows a nozzle of the spray container or dispenser to be elevated at different spray angles.

2. The applicator of claim 1, wherein, the connector at the proximal end of the flat panel body is circular in shape forming a rim having an inner surface and an outer surface.

3. The applicator of claim 2, wherein, the rim of the connector extends downward to form a skirt for adaptive fitting with a lid of a sprayer.

4. The applicator for of claim 3, wherein the rim of the connector along with the skirt is divided into a major arc portion and a minor arc portion.

5. The applicator of claim 4, wherein, the major arc portion extends to form the applicator and the minor arc portion placed diametrically opposite to the applicator is open for easy adaptability with the sprayer bottle.

6. The applicator of claim 1, wherein a thickness of the flat panel body is 0.76 mm.

7. The applicator of claim 3, wherein, for mounting on an outer surface of the lid of the sprayer, a radius of the inner surface of the rim of the proximal end of the flat panel body is 15.02 mm and a radius of the outer surface of the rim of the proximal end of the flat panel body is 20.21 mm.

8. The applicator of claim 4, wherein an opening of the minor arc portion of the rim lying diametrically opposite to the applicator is 20 mm.

9. The applicator of claim 4, wherein, the length of the flat panel body from an end of a nozzle at the distal end of the applicator till a center of the rim of the applicator at the proximal end measures 86.80 mm and a total length of the applicator measuring from a tip of the distal end of the applicator is 103.55 mm.

10. The applicator of claim 1, for mounting the spray applicator within an inner surface of the lid of the sprayer, a radius of an inner surface of the rim of the proximal end of the panel is 10.10 mm and a radius of an outer surface of the rim of the proximal end of the flat panel body is 13.95 mm.

11. The applicator of claim 4, for mounting the applicator within an inner surface of the lid of the sprayer, wherein, an opening of the minor arc portion of the rim lying diametrically opposite to the applicator is 10 mm.

12. The applicator of claim 1, wherein, for mounting the applicator within an inner surface of the lid of the sprayer, a length of the flat panel body from the end of the nozzle at the distal end of the applicator till a center of the rim of the applicator at the proximal end measures 86.80 mm and a total length of the applicator measuring from the tip of the distal end of the applicator is 99.65 mm.

13. The applicator of claim 1, wherein, the distal edge of the flat panel body of the applicator is designed in a wavy form by placing alternate concave and convex arcs.

14. The applicator of claim 13, wherein a radius of each of the concave or convex arcs is 1.20 mm.

15. The applicator of claim 13, wherein a distance from a center of each concave or convex arcs with respect to a next concave or convex arc is 3.40 mm and a width between a crest and a trough of curves is 0.65 mm.

16. The applicator of claim 1, wherein, an edge of the distal end of the flat panel body of the applicator is designed to form triangles, thereby providing it with a pointed structure.

* * * * *